No. 615,704.  
Patented Dec. 13, 1898.

F. G. D. HOLMES.
GEARING.
(Application filed Aug. 18, 1898.)

(No Model.)

WITNESSES:  
O. C. Winge  
Wm Paxton

INVENTOR  
F. G. D. Holmes  
BY  
Thomas Drew Stetson  
ATTORNEY

UNITED STATES PATENT OFFICE.

FRANCIS G. D. HOLMES, OF PHILLIPSBURG, NEW JERSEY.

GEARING.

SPECIFICATION forming part of Letters Patent No. 615,704, dated December 13, 1898.

Application filed August 18, 1898. Serial No. 688,853. (No model.)

*To all whom it may concern:*

Be it known that I, FRANCIS G. D. HOLMES, a citizen of the United States, residing at Phillipsburg, in the county of Warren and State of New Jersey, have invented a certain new and useful Improvement in Gearing, of which the following is a specification.

I provide antifriction devices in the form of peculiarly-arranged ball-bearings adapted to traverse around in circular paths on the several teeth of one of the wheels. Means are provided for changing the position of the hardened rings, which form the track or way, so as to distribute the wear.

The invention will serve either with wheels which are on parallel axes, as ordinary spur-gear, or wheels which are on variously-inclined axes, as ordinary bevel-gear.

The accompanying drawings form a part of this specification and represent what I consider the best means for carrying out the invention.

Figure 1:
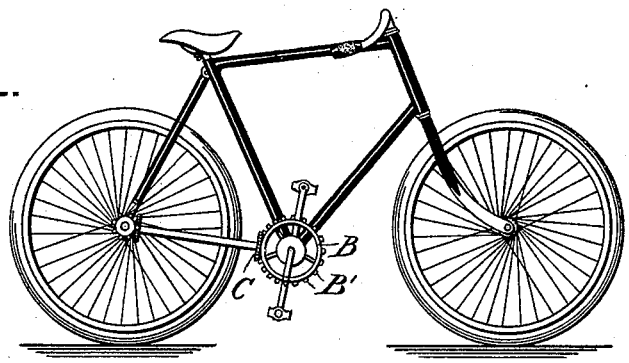
Figures 2, 3, 5:
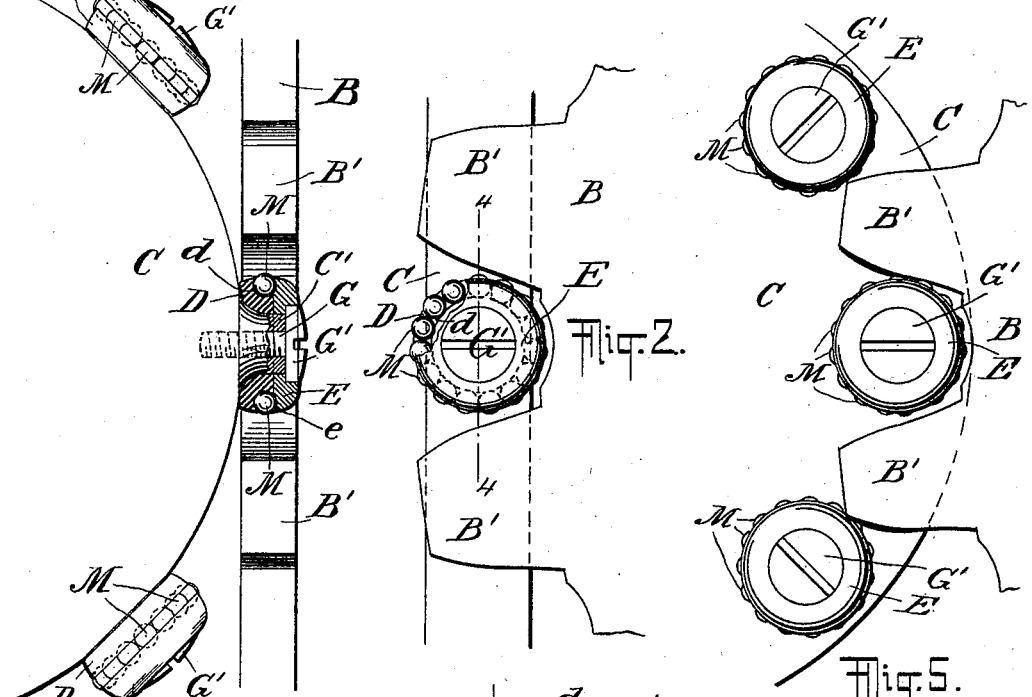
Figure 4:
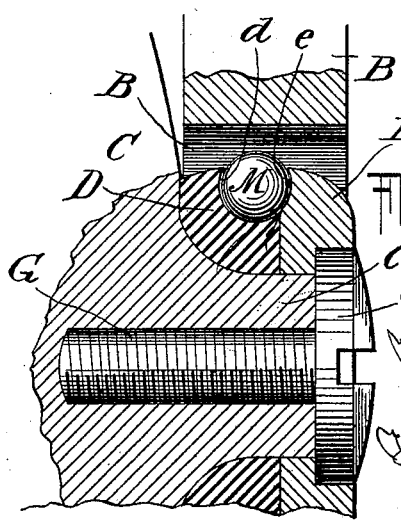

Figure 1 is a side view showing the invention applied to a bicycle. Fig. 2 is a corresponding view of a portion on a larger scale. Fig. 3 is an elevation, partly in section, showing the same parts viewed at right angles thereto. It is a view from the left in Fig. 1. Fig. 4 is a section on the line 4 4 in Fig. 2 on a still larger scale. Fig. 5 is a view corresponding to Fig. 2, showing a modification.

Similar letters of reference indicate corresponding parts in all the figures where they appear.

The wheels are supported in bearings in the framing, which may be in all respects of the ordinary character. The wheels may be skeleton or open work, but I will show them as continuous disks.

B is a large wheel carried on the crank-shaft. C is a smaller wheel fixed on the shaft extending longitudinally, and receiving the motion from the wheel B communicates it to the rear driving-wheel.

The teeth of the wheel B may have the general form of ordinary spur-gears. They may be chilled iron or high steel hardened and accurately ground to shape.

The wheel C is formed with a series of short nicely-finished radial studs C', and the periphery of the wheel adjacent thereto is ground or otherwise finished plane. Against the fair bearing thus provided I set a ring D, fitting closely and having a circular groove *d* sunk in its outer face to form something more than half of a circular way or race for the balls. E is a counterpart ring, also matching closely on the stud C' and having a groove *e* adapted to form the remainder of the way or path for the balls.

G is a screw tapped into the wheel C in the line of the axis of the stud C' and having a broad head G', which engages in a rabbet in the ring E. The thickness of the rings D and E to the bottom of that rabbet should be a little more than equal to the length of the stud C'. The head G' of the screw is adapted to fill the rabbet and make a proper finish on the outer face of the set of parts which serves as a tooth.

M M are a series of balls adapted to traverse around in the way formed by the two grooves *d* and *e*. These collections of parts serve in place of the several teeth of the wheel C—that is to say, each stud C', with its screw G G' and its two rings D and E and series of balls M, takes the place of a tooth and may be collectively referred to as a "tooth." The balls are of such diameter that they project a little outside of the peripheries of the rings D and E, and the way is of such width that the balls are allowed to roll freely and also to be traversed bodily a little to the right and left. It is, as will appear farther on, mainly necessary to provide this space for lateral traverse of the balls on the inner side of the path, that provided by the groove *d*.

In applying the parts together each stud C' is brought into an upright position, the ring D dropped upon it, and the several balls M are introduced. Care should be taken to so proportion the parts that the balls will make an easy contact each with the other quite around. Next the ring E is dropped into place, and, lastly, the screw G is applied and screwed down with force. The strong pressure of the rim of the head G' upon the base of the rabbet in the ring E holds this ring and the ring D firmly, as in a vise, in their proper positions upon the wheel C, leaving the balls M free to be traversed around in their circular way. When all the studs are thus equipped and the wheel is mounted in its bearings and set to work, the several teeth B' of the wheel B act successively on the several teeth of the wheel C and induce the revolution. The force to transmit the power is applied through the balls M by the fair contact of the face of one of the teeth B' against the balls, which slightly project beyond the inclosing rings D and E. Instead of the ordinary rubbing the balls can roll to accommodate the motion and transmit the force without loss from friction. At each contact the balls M roll a little in two directions. They roll circumferentially of the rings D E to accommodate the curvature of the motion of the teeth B' and they roll a little transversely of the rings D E to accommodate the curvature of the motion of the wheel C. It is for this latter motion that I provide the space for the rolling of the balls mainly in the ring D. During each contact the balls roll inward toward the center of the wheel C to an extent equal to the versed sine of the arc described by a point in the wheel C during the period of contact. The rolling in the other direction will by giving the proper form to the teeth be reduced to a small amount, but it is always approximately the versed sine of the arc described by a point in the wheel B during the period of contact. The force received through the pressure of the teeth B' on the balls M, which chance to be in position, is all received in one part of the base of the path of the balls. At intervals the person in charge of the machine should slacken the several screws G G', thus liberating the rings D and E, turn these rings a portion of a revolution, and set them fast in the new position by again tightening the screws G G'. This brings the wear in new places.

I prefer that the rings D and E should fit quite tightly upon the studs C'. In case it is necessary an instrument, as gas-pipe tongs, properly recessed to avoid contact with the balls, may be applied to aid in turning the rings in effecting those occasional changes of position.

I make the parts of high steel hardened to endure wear a long time; but the capacity for shifting around these rings is important in distributing the wear uniformly.

Modifications may be made without departing from the principle or sacrificing the advantages of the invention. Instead of thickening the base of each stud C' by making the outline with a curve, as shown, the post or stud may be continued down to the surface of the wheel. It is important that the periphery of the wheel adjacent to each post be made plane in order to allow a fair bearing for the ring D, as it may be turned in various positions. Instead of making the groove $d$ of greater depth than the recess $e$ in the ring E they may be equal in depth. I prefer the construction shown, as it gives a better track on which the balls M may travel around.

When the shafts of the wheels are not at right angles, the studs C' may be set at a corresponding angle, so that the balls carried thereon will traverse in the same way under the action of the teeth B'. This may be carried to such extent that the axes may be parallel like spur-gear. In such case the studs C' will be set in one of the faces of the wheel C with their axes parallel to the axis of the shaft. Fig. 5 shows such a modification.

It will be understood that the balls and their raceways should be lubricated at intervals; also, that it is of advantage to inclose the whole gearing in a dust-proof casing.

It will be understood that the antifriction construction which I have applied on the small wheel C may be applied in greater numbers on the large wheel B, and in such case the small wheel C will carry plain teeth. Either wheel may be the driver and the other the driven wheel.

I claim as my invention—

1. In toothed gear the combination with a plain toothed wheel B B', of the wheel C, carrying studs C', rings D $d$, and E $e$, holding means G G' and balls M, arranged to serve substantially as herein specified.

2. In toothed gear a series of antifriction-balls extending around the teeth of one wheel adapted to receive and transmit the force with little friction, as herein specified.

In testimony that I claim the invention above set forth I affix my signature in presence of two witnesses.

FRANCIS G. D. HOLMES.

Witnesses:
WM. A. HUMMER,
AUSTIN R. ALPAUGH.